Feb. 23, 1937.  O. D. H. BENTLEY  2,071,914
PRESSURE COMPENSATION FOR PACKING
Filed Dec. 7, 1935  2 Sheets-Sheet 1
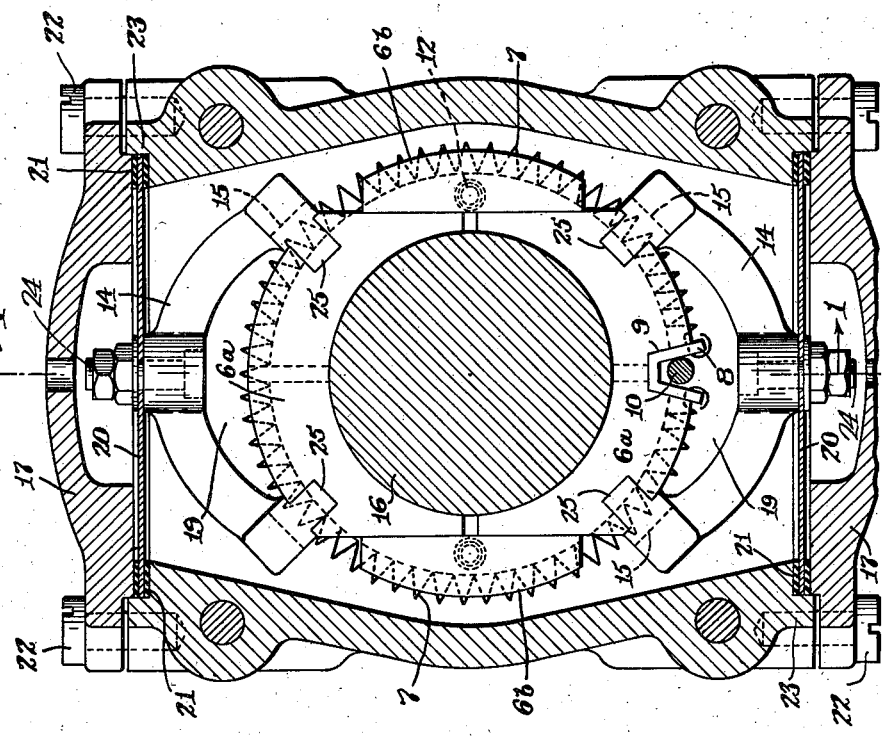
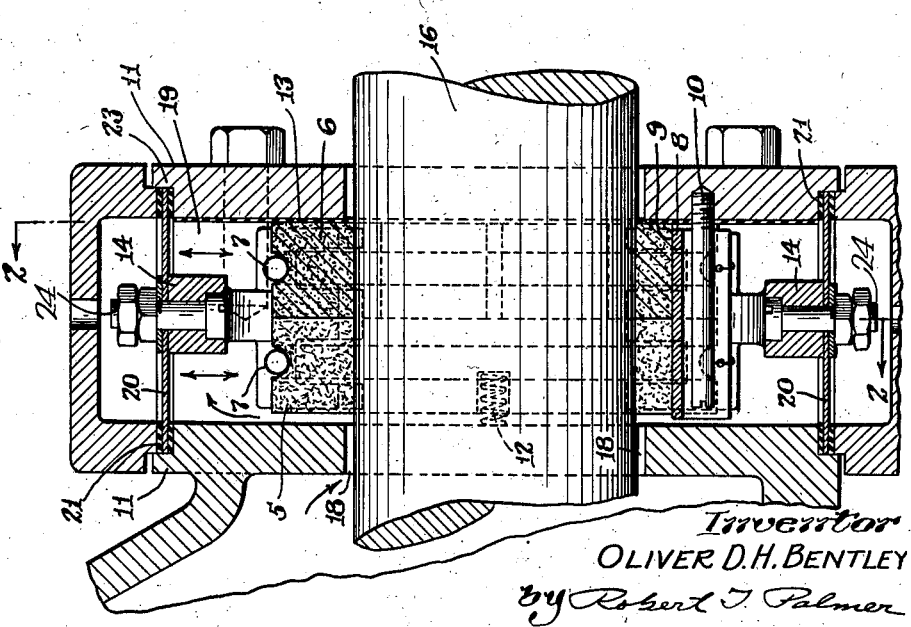
Inventor
OLIVER D. H. BENTLEY
by Robert T. Palmer
Attorney Feb. 23, 1937.   O. D. H. BENTLEY   2,071,914
PRESSURE COMPENSATION FOR PACKING
Filed Dec. 7, 1935   2 Sheets-Sheet 2

Inventor
OLIVER D. H. BENTLEY
by Robert T. Palmer
Attorney

UNITED STATES PATENT OFFICE 2,071,914

PRESSURE COMPENSATION FOR PACKING

Oliver D. H. Bentley, Norfolk, Mass., assignor to B. F. Sturtevant Company, Inc., Boston, Mass.

Application December 7, 1935, Serial No. 53,370

7 Claims. (Cl. 286—20)

This invention relates to packings for the sealing in of high pressure fluids and relates more particularly to packings for the prevention of steam leakage.

In steam turbines, for example, where extremely high steam pressures are utilized, the packing around the rotating shaft is itself exposed to the steam pressure which not only acts along it in a direction longitudinally of the shaft but acts upon it radially towards the shaft, forcing it with unnecessary pressure against the rotating shaft.

According to this invention, there is provided a pressure compensation for packings, which opposes the radial pressure of the steam. In one embodiment of the invention, the packing is in the form of divided rings, and diaphragms having a total area slightly less than the projected area of the outer portions of the rings exposed to the pressure of the steam, are arranged within the turbine case with steam acting on their under sides and so connected to the packing that the steam acting on the diaphragms causes them to tend to move the packing outwardly from against the shaft, thus opposing the radial pressure exerted on it by the steam.

An object of the invention is to reduce the radial pressure by high pressure fluid upon packings.

Another object of the invention is to relieve the pressure of a packing against the rotating shaft of a steam turbine by providing means effected by the steam for opposing its action upon the packing.

Other objects of the invention will be apparent from the following description taken together with the drawings.

The invention will now be described with reference to the drawings of which:

Fig. 1 is a side sectional view of a packing arrangement according to this invention taken along the lines 1—1 of Fig. 2;

Fig. 2 is an end section taken along the lines 2—2 of Fig. 1; and

Figure 3:
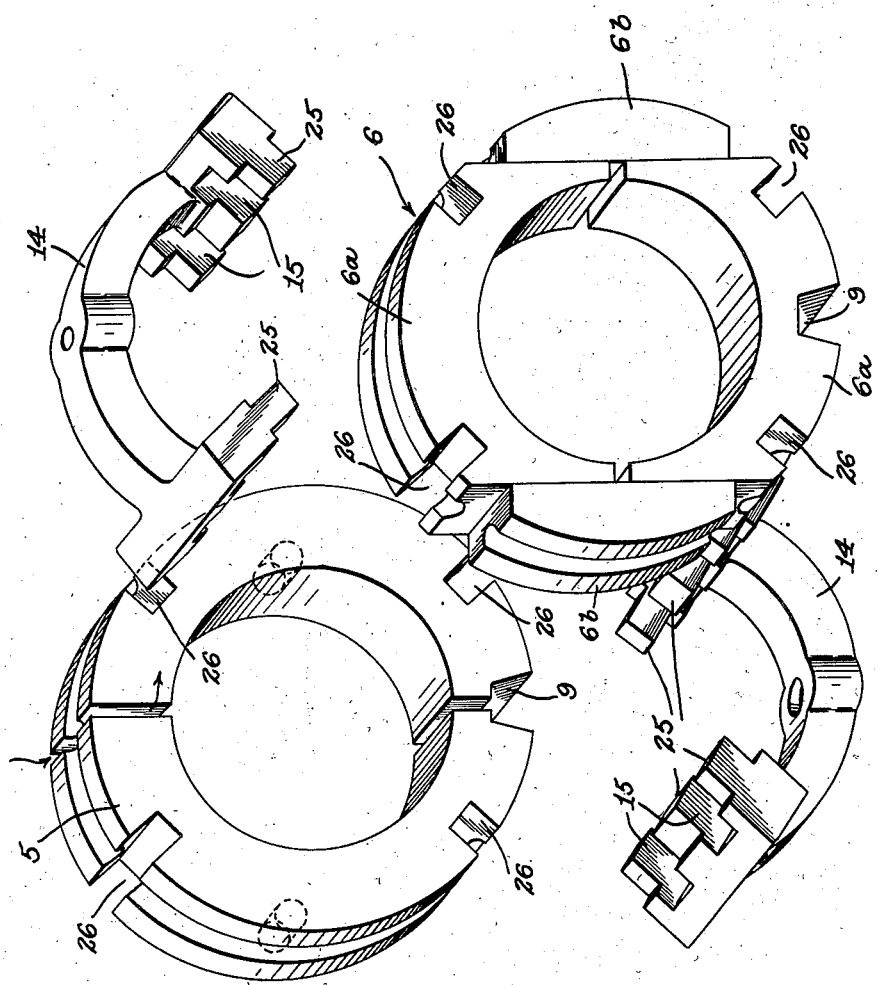
Fig. 3 is an exploded view in perspective of the packing rings and pressure relief lever according to this invention.

The packing utilized is the carbon type utilizing two part and four part rings. The four part ring seals the shaft and cover and the two part ring seals the four part ring as will now be described. The two part ring 5 and the four part ring 6 are shown more clearly by Fig. 3 of the drawings. The four part ring indicated generally by the numeral 6 is made up of the two large segments 6a and the two small segments 6b.

Referring now to Figs. 1 and 2, the rings 5 and 6 are held in place around the rotary shaft 16 by means of the two garter springs 7, one for each ring. The ends of the springs 7 are connected to the members 8, which fit into the slots 9 in the rings. To oppose rotation of the rings, the pin 10 is tapped into the cover plate 11 and fits into the channel formed within the member 8. The seal springs 12 are under compression between the cover plate 11 and the ring 5 and force the ring 5 against the ring 6, and the ring 6 against the gasket 13.

The four part ring 6 seals the shaft 16 and cover 11, this being accomplished by the two smaller segments 6b which seal the clearance between the ends of the two larger segments 6a. This clearance is provided to allow the segments 6a to ride down on the shaft when they wear. The two part ring 5 fits tightly against the four part ring 6 under the force of the springs 12 and seals the ring 6.

In operation steam passes through the opening 18 around the shaft 16 into the packing chamber 19 and due to substantial area of the rings exposed to the steam pressure, there is a considerable pressure exerted by the steam upon the rings forcing them against the shaft. This pressure is opposed by the mechanism which will now be described.

The two diaphragms 20 are mounted, one above and one below the rings as illustrated by Figs. 1 and 2, with their inner sides exposed to the pressure of the steam within the chamber 19. Each of the diaphragms is clamped between the gaskets 21 by the cover 17 and the seat 23 forced by a flange in the cover plate 11. The covers 17 are forced against the outer gaskets 21 by the bolts 22 threaded into tapped openings in the plates 11.

The tong or hook members 14 are attached to the diaphragm 20 by means of the bolts 24 which extend through the centers of the members 14 and the diaphragms. The extensions 25 on the members 14 fit closely into the slots 26 in the rings 5 and 6. The slots 27 between the extensions 25 are for spanning the springs 7.

In operation the steam pressure against the inner sides of the diaphragm 20 tends to cause outward movement of the diaphragm and to cause the members 14 to move the rings away from the shaft. The steam pressure at the same time on the outer surfaces of the rings tends to force the rings against the shaft. If the diaphragms have the same area exposed to steam pressure as the rings have, no movement of the rings towards or away from the shaft will take place. The effective area of the diaphragms may be made slightly less than that of the projected area of the outer surfaces of the rings exposed to steam pressure so that the steam will exert a slight inward pressure upon the rings, or the proportions may be so chosen that the inward and outer pressures are equal so that there is a balanced condition.

Whereas one embodiment of the invention has been described for the purpose of illustration, it should be understood that the invention is not limited to the arrangement described, as many departures will suggest themselves to those skilled in the art, after having had access to this disclosure.

What is claimed is:

1. A packing assembly comprising in combination, a rotary shaft, a packing ring around said shaft exposed to fluid pressure acting to press said ring against said shaft, a diaphragm also exposed to the action of said fluid pressure for opposing said action of said fluid pressure, and means connecting said diaphragm and said ring.

2. A packing assembly comprising in combination, a rotary shaft, a packing ring around said shaft exposed to fluid pressure acting to press said ring against said shaft, means forming a surface spaced from said ring, also exposed to the action of said fluid pressure but acting to move said ring from against said shaft, and means connecting said surface and said ring.

3. A packing assembly comprising in combination, a rotary shaft, a packing ring around said shaft and exposed to fluid pressure acting to press said ring against said shaft, said ring being divided into a plurality of segments, means forming a plurality of surfaces spaced from said ring, also exposed to said fluid pressure acting on each of said segments for opposing said action of said fluid pressure, and means connecting each of said segments with one of said surfaces.

4. A packing assembly comprising in combination, a rotary shaft, a packing ring around said shaft and exposed to fluid pressure acting to press said ring against said shaft, and ring being divided into a plurality of segments, a plurality of diaphragms also exposed to said fluid pressure but acting to move said segments from against said shaft, and means connecting each of said segments with one of said diaphragms.

5. A packing assembly comprising in combination, a packing chamber, a rotary shaft extending through said chamber, an opening around said shaft admitting steam into one end of said chamber around said shaft, packing around said shaft in said chamber for preventing the escape of steam around said shaft at the other end of said chamber, means forming a surface within said chamber spaced from said packing utilizing the steam therein, opposing the tendency of the steam pressure on said packing to press said packing against said shaft, and means connecting said surface and said packing.

6. A packing assembly comprising in combination, a packing chamber, a rotary shaft extending through said chamber, an opening around said shaft admitting steam into one end of said chamber around said shaft, packing rings around said shaft in said chamber for preventing the escape of steam around said shaft at the other end of said chamber, a plurality of diaphragms within said chamber exposed to the steam therein, opposing the tendency of the steam pressure on said packing rings to press said packing rings against said shaft, and means connecting said diaphragms and said rings.

7. A packing assembly comprising in combination, a packing chamber, a rotary shaft extending through said chamber, an opening around said shaft admitting steam into one end of said chamber around said shaft, packing having a plurality of segments around said shaft in said chamber for preventing the escape of steam around said shaft at the other end of said chamber, a plurality of diaphragms one for each of said segments, within said chamber exposed to the steam therein, opposing the tendency of the steam pressure on said packing to press said packing rings against said shaft, and means connecting each of said segments with one of said diaphragms.

OLIVER D. H. BENTLEY.